(12) United States Patent
Pochopien et al.

(10) Patent No.: US 9,667,041 B2
(45) Date of Patent: May 30, 2017

(54) ELECTRICALLY INSULATING COVER FOR TERMINAL ASSEMBLY

(71) Applicant: Rockwell Automation Technologies, Inc., Mayfield, OH (US)

(72) Inventors: Jacek Tomasz Pochopien, Zywiec (PL); Troy M. Bellows, Racine, WI (US); Pawel Kokula, Dabrowa Gornicza (PL)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/927,921

(22) Filed: Oct. 30, 2015

(65) Prior Publication Data

US 2017/0125983 A1    May 4, 2017

(51) Int. Cl.
*H05K 5/00* (2006.01)
*H02B 1/21* (2006.01)
(Continued)

(52) U.S. Cl.
CPC ............ *H02B 1/21* (2013.01); *H01R 4/30* (2013.01); *H01R 4/70* (2013.01)

(58) Field of Classification Search
CPC .... A61N 1/3752; H02B 1/21; H01H 85/2035; H01H 85/205; H01H 85/2045;
(Continued)

(56) References Cited

U.S. PATENT DOCUMENTS

| 3,168,683 A | 2/1965 | Brokaw |
| 3,908,668 A * | 9/1975 | Bolduc ............... H01R 4/36 439/814 |

(Continued)

FOREIGN PATENT DOCUMENTS

| EP | 0748018 A2 | 11/1996 |
| EP | 2747217 A2 | 6/2014 |

(Continued)

OTHER PUBLICATIONS

Allen-Bradley Bulletin 100-C104-C Accessories_Mar. 2014.*

(Continued)

*Primary Examiner* — Timothy Thompson
*Assistant Examiner* — Guillermo Egoavil
(74) *Attorney, Agent, or Firm* — Boyle Fredrickson, S.C.

(57) ABSTRACT

A terminal assembly may be provided which utilizes an electrically insulating cover to electrically isolate upper portions of screw terminals. The electrically insulating cover could be made from plastic, rubber or some other electrical insulator, and could be mounted on a frame configured to engage with a frame supporting the screw terminals. While lower portions of the screw terminals may continue to electrically connect with electrical connectors for receiving load stab conductors (from a unit), upper portions of the screw terminals may be electrically isolated to protect from short-circuit, and/or shock, such as while a door or access panel of a wire-way is removed. The electrically insulating covers may also include cable glands for circumferentially surrounding wires leading to the screw terminals. A retainer clip may also be used to securely hold the electrically insulating covers to the frame supporting the screw terminals.

14 Claims, 13 Drawing Sheets

(51) Int. Cl.
*H01R 4/30* (2006.01)
*H01R 4/70* (2006.01)

(58) Field of Classification Search
CPC ...... H01H 2085/208; H01R 4/30; H01R 4/70; H01R 4/34; H01R 4/36; H01R 4/4827; H01R 4/4845; H01R 9/2416; H01R 13/512; H01R 13/582
USPC ....... 174/18, 66, 67; 220/241, 242; 439/718, 439/724, 620.33, 721, 814; 607/37
See application file for complete search history.

(56) References Cited

U.S. PATENT DOCUMENTS

| | | | |
|---|---|---|---|
| 4,331,375 A | 5/1982 | Takamatsu | |
| 4,722,701 A * | 2/1988 | Bradt | H01H 85/2035 |
| | | | 439/620.33 |
| 6,078,718 A * | 6/2000 | Merriken | G02B 6/4471 |
| | | | 385/135 |
| 6,452,100 B1 * | 9/2002 | Marcinek | H01R 13/512 |
| | | | 174/66 |
| 8,420,935 B2 | 4/2013 | Malkowski, Jr. et al. | |
| 2009/0181577 A1 * | 7/2009 | Zahnen | H01R 4/36 |
| | | | 439/604 |
| 2013/0122751 A1 * | 5/2013 | Ciampolini | H01R 4/34 |
| | | | 439/657 |
| 2016/0028170 A1 * | 1/2016 | Hyder | H01R 9/2416 |
| | | | 439/462 |

FOREIGN PATENT DOCUMENTS

| | | |
|---|---|---|
| FR | 2580860 A1 | 10/1986 |
| FR | 2736472 A1 | 1/1997 |
| JP | 05226011 A * | 9/1993 |

OTHER PUBLICATIONS meikeda.en.ecplaza__Apr. 2012.*
Extended Search Report, Application No. EP16195884.8; Applicant Rockwell Automation Technologies, Inc.

* cited by examiner

US 9,667,041 B2

ELECTRICALLY INSULATING COVER FOR TERMINAL ASSEMBLY

FIELD OF THE INVENTION

The present invention relates generally to electrical systems, and more particularly, to electrical power distribution in such systems.

BACKGROUND

Electrical systems with packaged electrical and electronic components are known and are in use. For example, Motor Control Centers (MCC's) are used for power and data distribution in large and industrial operations. In MCC's, a variety of components, such as switchgear, semiconductor power electronic circuits, programmable logic controllers, motor controllers, and so forth, are housed in large electrical enclosures that may be subdivided into sections or columns, which may be further subdivided into compartments. The MCC includes associated bus bars, interconnections and supporting structures for distribution of electrical power to the various compartments.

Typically, the MCC is connected to a main power line that may feed three-phase AC power to horizontal bus bars of the MCC. The horizontal bus bars, in turn, may feed the three-phase power to vertical bus bars disposed in each of the sections or columns of the MCC. The vertical bus bars, in turn, may feed the three-phase power to various units (which typically include electrical components) that are installed in compartments of a section. The units, in turn, may provide power terminals (conductors), such as copper bus bars, for feeding the three-phase power to a system environment, such as motors, as may be required for various applications.

To connect an MCC to a system environment, a unit having a door or access panel, covering electrical components and sets of load stab conductors may typically be pushed into a compartment of the MCC. A first set of load stab conductors may connect to the three-phase power provided by the MCC, such as via the vertical bus bars. A second set of load stab conductors may connect to electrical connectors leading to screw terminals provided in adjacent wire-ways of the MCC, which may also have a door or access panel. The screw terminals, in turn, may lead to the system environment, such as a motor.

However, in some instances, such arrangements could risk electrical short-circuit and/or shock, such as when making electrical connections with doors or panels removed, leaving screw terminals exposed. It is therefore desirable to minimize the possibility of electrical short-circuit and/or shock where possible.

SUMMARY OF THE INVENTION

The present inventors have recognized that a terminal assembly may be provided which utilizes an electrically insulating cover to electrically isolate upper portions of screw terminals. The electrically insulating cover could be made from plastic, rubber or some other electrical insulator, and could be mounted on a frame configured to engage with a frame supporting the screw terminals. While lower portions of the screw terminals may continue to electrically connect with electrical connectors for receiving load stab conductors (from a unit), upper portions of the screw terminals may be electrically isolated to protect from short-circuit and/or shock, such as while a door or access panel of a wire-way is removed. The electrically insulating covers may also include cable glands for circumferentially surrounding wires leading to the screw terminals. A retainer or retention clip may also be used to securely hold the electrically insulating covers to the frame supporting the screw terminals.

Aspects of the invention may provide improved protection for fingers or similarly sized objects which may encounter screw terminals, such as in accordance with IEC 60529 IP20 (International Protection Rating for fingers or similar objects) standard. Aspects of the invention may also provide electrical isolation to protect from hazards such as "arc flash" (a phenomena in which a luminous discharge of current is formed when a current jumps a gap, through air or gas, in a circuit or between two conductors).

Aspects of the invention may provide a terminal assembly including a frame (extension load stab housing), rubber wire gland and covers, a wire spring clamp for protection, and a load stab. The load stab extension housing may be formed from a single molded part (which may also be electrically insulating). The cover and wire gland may be a combined (which may also be an electrically insulating material). The wire gland may be adapted to various wire (or cable) diameters by cutting off a section by section. A number may be provided on the wire gland itself to show a wire diameter after cutting. Metal spring clips may also be provided for improved safety in which removal of such clips may require a tool, such as pliers.

One or more advantages of the invention may include: an extension housing (frame) which may avoid complex and/or costly rework of current implementations and tooling; easier installation over previous designs, including by ensuring proper space/dimensioning for installation of equipment, such as lugs, wires and screws; easier implementation into older systems with older bracket and/or mounting types; IEC 60529 IP20 (International Protection Rating for fingers or similar objects) compatibility; a simplified installation; an improved security of usage via difficult in disassembly without tools; a simplified mechanism for inspecting and verifying connections; compatibility with preexisting parts; combined wire gland (which may be rubber) and cover in a single part; and/or metal spring clips for improved retention and for allowing ease of installation or assembly, typically requiring tools for removal.

Specifically then, one aspect of the present invention provides an electrically insulating cover for a terminal assembly including; an upper surface configured to cover an upper portion of a screw terminal; and a cable gland attached to an end of the upper surface, the cable gland including a plurality of concentric rings of varying diameters, each ring being configured to circumferentially surround and substantially seal a cable or wire of a particular size. The electrically insulating cover is operable to electrically insulate an upper portion of a screw terminal.

Another aspect may provide a terminal assembly including: an electrical connector configured to receive a conductor upon the conductor being pushed into the electrical connector; a screw terminal having an upper portion configured to receive a conductor and a lower portion configured to electrically communicate with the electrical connector; and an electrically insulating cover disposed over the screw terminal. The electrically insulating cover is operable to electrically insulate the upper portion of the screw terminal.

Another aspect may provide an electrical system including: a compartment configured to receive a unit having an electrical component; a wire-way disposed adjacent to the compartment; multiple electrical connectors provided in the compartment, the electrical connectors configured to receive a set of load stab conductors upon a unit having a set of load stab conductors being pushed into the compartment causing the set of load stab conductors to be pushed into the electrical connectors; multiple screw terminals provided in the wire-way, each screw terminal having an upper portion configured to receive a crimped wire lug conductor and a lower portion configured to electrically communicate with an electrical connector; a frame supporting the multiple electrical connectors and the multiple screw terminals; and multiple electrically insulating covers disposed over the multiple screw terminals. The electrically insulating covers are operable to electrically insulate the upper portions of the screw terminals.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
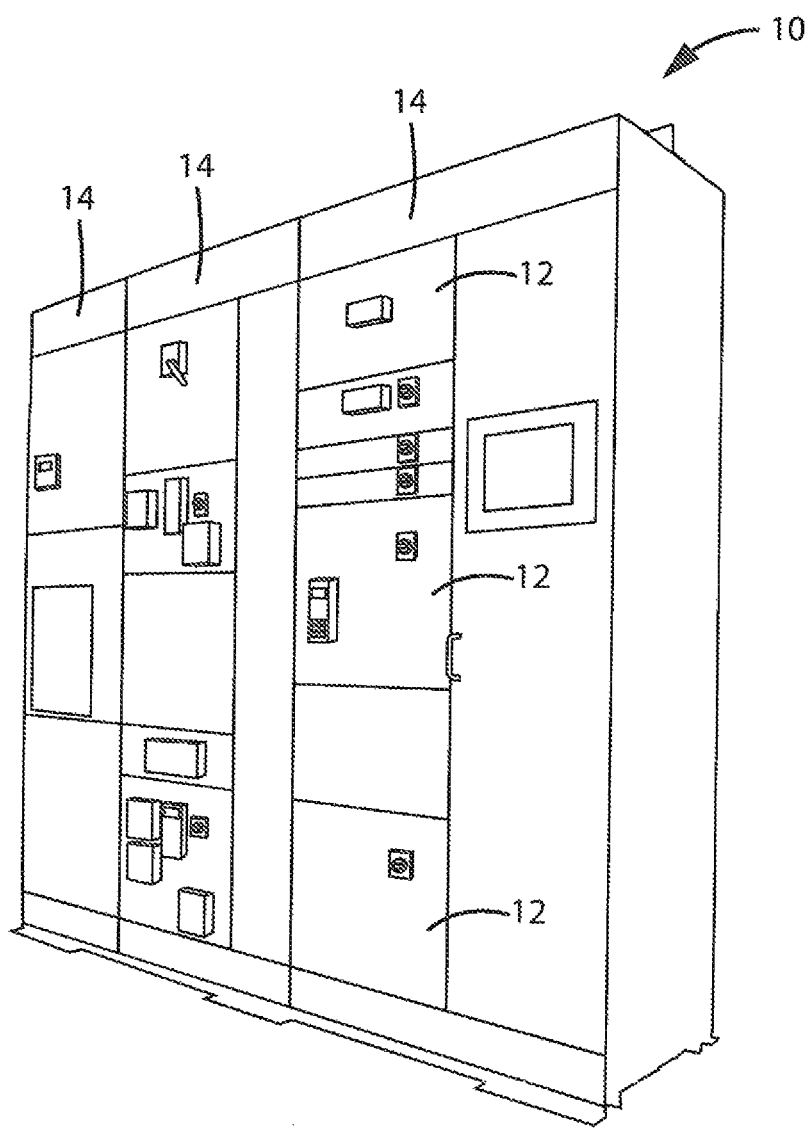
FIG. 1 is an isometric view of an exemplar electrical system in which electrical units of various types may be housed in accordance with an embodiment of the invention.
Figure 2:
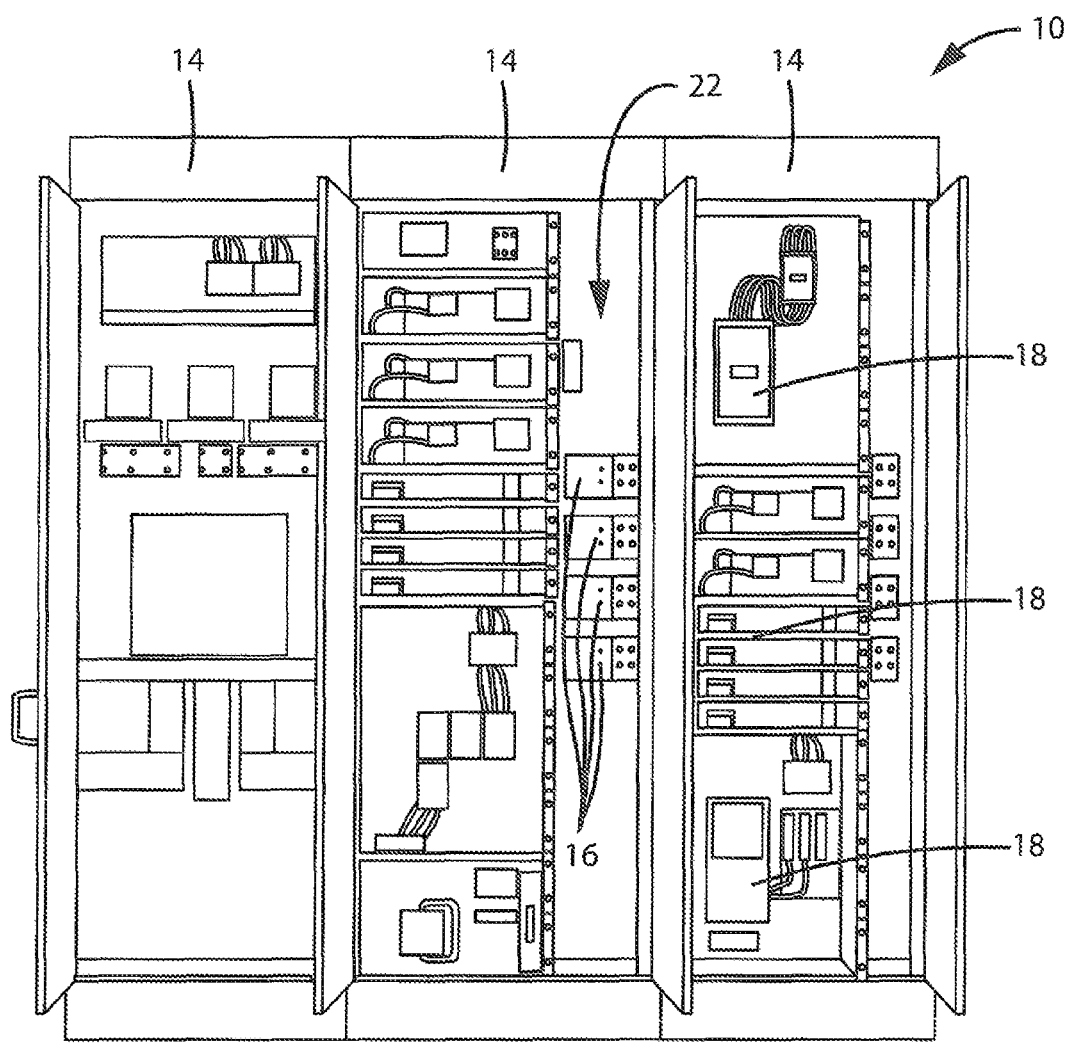
FIG. 2 is an interior view of the electrical system of FIG. 1.

Referring now to FIGS. 1 and 2, an exemplar electrical system 10 is provided in which electrical units 12 of various types may be housed. The electrical system 10 may be for example, a Motor Control Center ("MCC") or other industrial, commercial, marine, or other electrical system. In general, the electrical system 10 may provide one or more sections 14, each forming a shell around a device mounting volume for supporting the units 12. The shell may be made of any suitable material, such as heavy gage sheet metal, reinforced plastics, and so forth. The electrical system 10 may typically receive three-phase power from an external power supply, such as a power supply grid, and/or data signals, via appropriate conduits (not shown), and distribute the received power and/or data signals to one or more of the sections 14 in various manners. The sections 14 may be electrically isolated from one another, or alternatively, may be electrically joined with other sections 14, such as via common horizontal power buses 16.

The units 12 may each include a door for covering an assembly of components 18 that are supported within each unit 12 via known methods, such as screwed ("fixed feed" or "frame mounted") or snap-in ("withdrawable") engagement, thereby providing mechanical and electrical connection to the electrical system 10. Exemplary components 18 of the units 12 may include relays, motor starters, and Programmable Logic Controllers ("PLC's"), among others. Doors for the units 12 may include, for example, a lever (such as a rotary lever to turn ON and OFF a Circuit Breaker inside the unit and enabling opening of the door when the Circuit Breaker is OFF), a lock for preventing the door from opening, and/or light for indicating a safe condition for opening the door. A latch rail (not shown) may be provided in each section 14 to interface with latches on the individual doors of the units 12.

The sections 14 may also include wire-ways 20 in which line and load wiring, cabling and so forth may be installed to service the components 18. The sections 14 may optionally include preconfigured isolation areas 22 for variations in which greater electrical isolation between sections 14 is desired, such as in compliance with IEC 61439-2 Forms 3, 3a. 4 or 4b.

Figure 3:
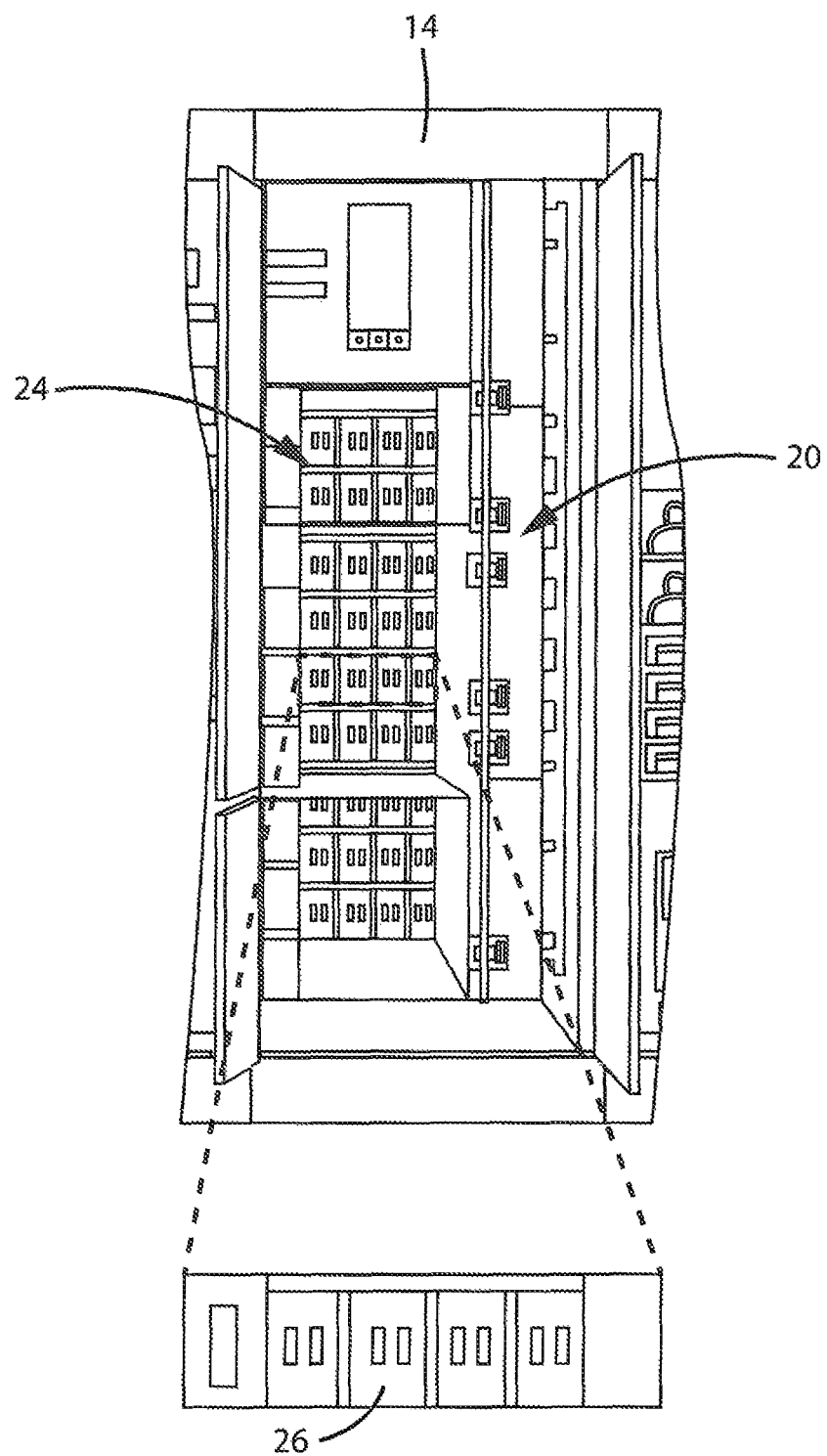
FIG. 3 is an interior view of a section of the electrical system of FIG. 1.

Referring also to FIG. 3, along a rear wall of each of the sections 14 may be disposed a vertical bus system 24 configured to facilitate distribution of power throughout a corresponding section 14, such as in a plug-in manner. The bus system 24 may be generally formed as a backplane having slots 26 for receiving conventional stab-type electrical connections on rear surfaces of device supports received within a section 14. Such slot and stab arrangements are generally known in the art. As illustrated, the slots 26 may be divided into pairs to receive a corresponding two-pronged stab for each phase of electrical power. Rows of such slots 26 may be provided to allow device supports to be mounted at various levels within a section 14.

Figure 4:
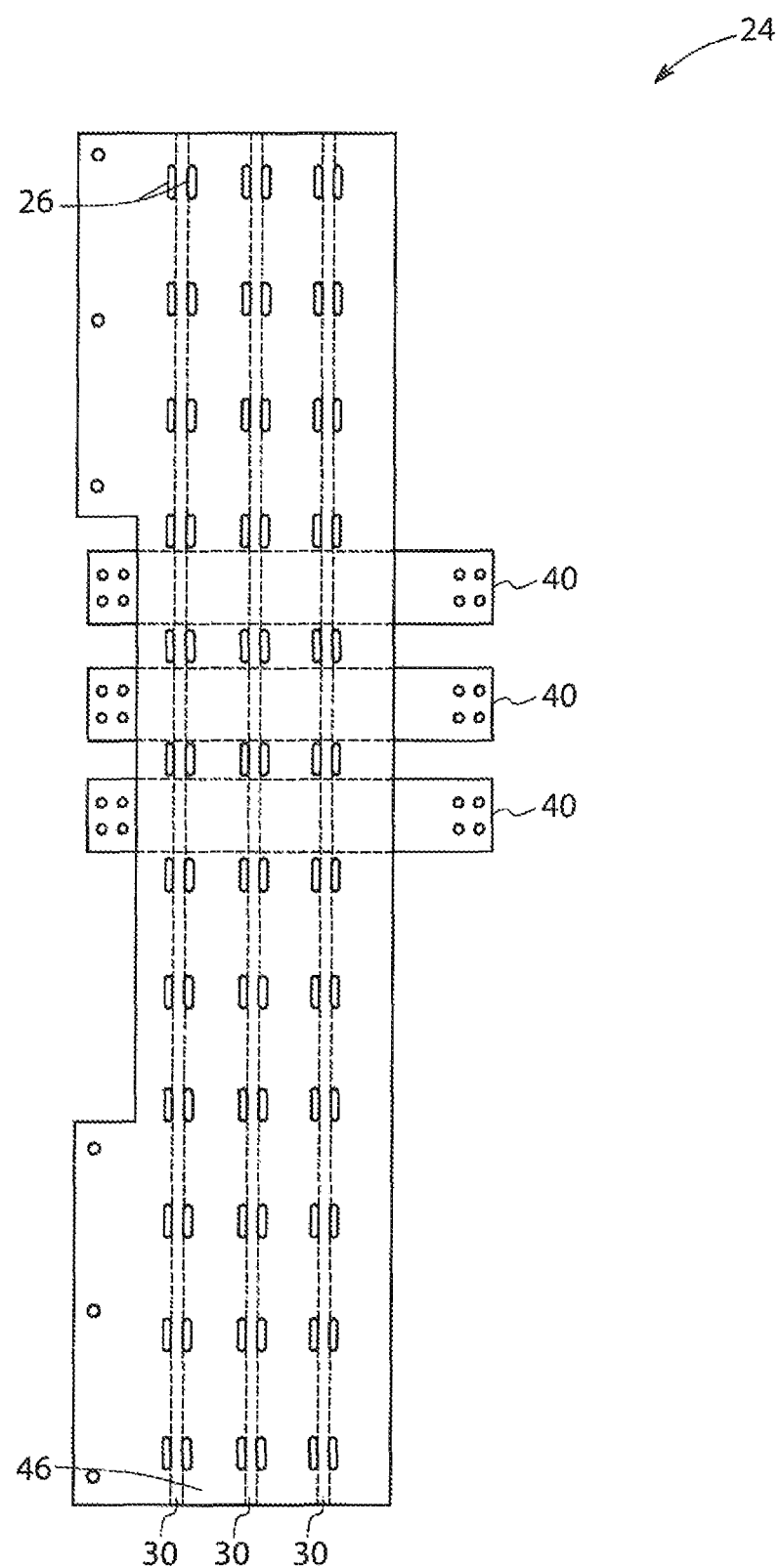
FIG. 4 is an exemplary configuration of the bus system of FIGS. 1-3.

Referring now to FIG. 4, an exemplary configuration of the bus system 24 of FIGS. 1-3 is provided. The bus system 24 may include multiple power busses disposed within a section 14. In the illustrated embodiment, the bus system 24 includes first, second and third vertical bus conductors 30 disposed proximal to one another, which may correspond to differing phases of a three-phase power system (Power conductors). Further, the bus system 24 includes first, second and third horizontal bus conductors 40 disposed proximal to one another, which may also correspond to the differing phases of the three-phase power system (power conductors), but in a different direction.

In certain embodiments, the horizontal bus conductors 40 could be coupled to cabling that supplies three-phase power from an external power supply, such as a power supply grid, and the first, second and third horizontal bus conductors 40 could be coupled to the first, second and third vertical bus conductors 30. Also, in certain embodiments, the horizontal bus conductors 40 of one section could be coupled (or "spliced") with the horizontal bus conductors 40 of another (flanking) section. In alternative embodiments, more horizontal and/or vertical bus conductors could be provided, such as for providing a neutral conductor, a protective earth, ground or additional power phase, or fewer horizontal and/or vertical bus conductors could be provided, as appropriate for the environment.

The bus system 24 may include a bus cover 46 and a rear bus support that will be described in greater detail below. In the illustrated embodiment, the bus cover 46 may include a molded sheet of synthetic material disposed over the vertical and horizontal bus conductors and may serve to prevent contact with underlying power busses except through the slots 26. The vertical bus conductors 30 are typically made of a bar stock or tubing stock with a flat area that permits them to be mechanically and electrically coupled to corresponding horizontal bus conductors 40 in the bus system 24.

Connection of component supports (such as mounted on plates or drawers, not shown) may be made by two pronged stabs that are received through the slots 26 and engage the individual bus bars behind the bus cover 46. As described above, the bus system 24 further includes a bus support configured to support the vertical and horizontal bus conductors that is described in detail below with reference to FIG. 5.

Figure 5:
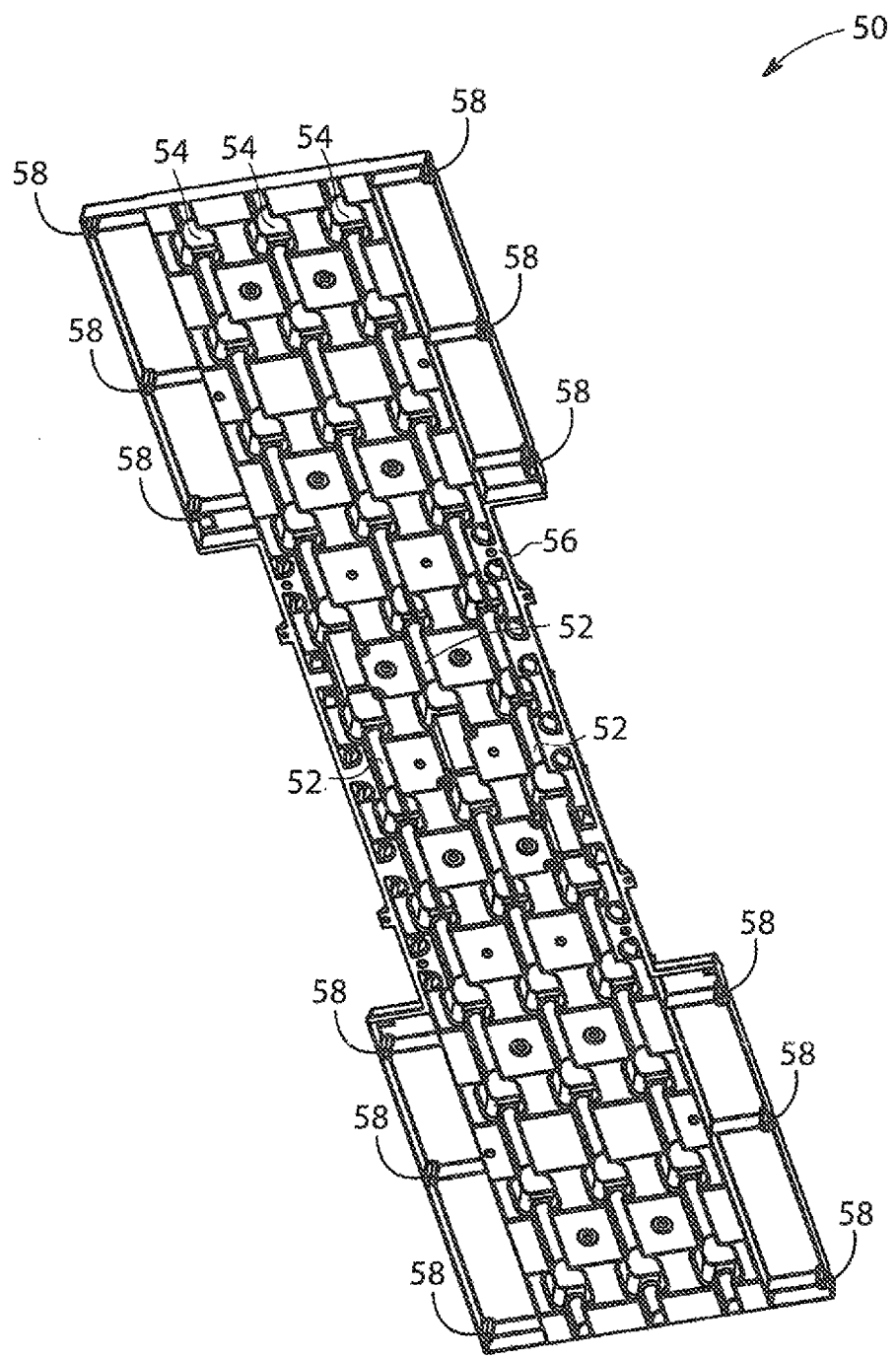
FIG. 5 is an exemplary preconfigured isolated bus support for supporting the power busses of the bus system of FIGS. 1-3.

Referring now to FIG. 5, an exemplary preconfigured isolated bus support 50 is illustrated for supporting the power busses of the bus system 24 of FIG. 2. As illustrated, the bus support 50 may be a molding with vertical channels 52 to receive the vertical bus conductors 30 of FIG. 2. Each of the vertical channels 52 may include rear protrusions 54 on a rear side 56 of the bus support 50. In the illustrated embodiment, the bus support 50 mechanically supports the various horizontal and vertical bus conductors. Within the bus system 24, and generally between the bus support 50 and the bus cover 46 (see FIG. 4), each vertical bus conductor may generally include a connection portion that is engaged by stabs of component supports and a bus anchoring portion.

Accordingly, the horizontal bus conductors 40 (see FIG. 4) may be generally supported on a rear surface of the bus support 50, while the vertical bus conductors 40 (see FIG. 4) may be supported on a front surface thereof. In the illustrated embodiment, the bus support 50 includes a series of apertures 58 or holes for receiving mounting bolts or screws. These apertures 58 will generally be aligned with corresponding apertures in rear of the electrical system 10 to support the bus system 24 when mounted therein. The vertical bus conductors 30 may be received within corresponding recesses of the vertical channels 52. The recesses may generally be semicircular grooves in which the vertical bus conductors 30 may lie.

Opposing the rear protrusions 54, which may be somewhat deeper than the recesses, are pockets designed to receive and accommodate stabs (not shown) of component supports that will protrude through the slots 26 in the bus cover 46. Furthermore, the bus support 50 may include a series of apertures (not shown) that extend completely through the bus support 50 for mechanical and electrical connection to the horizontal bus conductors 40.

In the illustrated embodiment, the bus support 50 may be formed as a single piece of molded plastic material. The material is preferably one that will not degrade or melt with elevated temperatures that may occur during normal operation. In certain embodiments, the bus support 50 may comprise glass filled polyester, a thermoset plastic. The bus support 50 could also include add-ort bus support braces (not shown) disposed on the rear side of the bus support which may be configured to contact the Channels to limit movement of the vertical bus conductors during a high current event.

Figure 6:
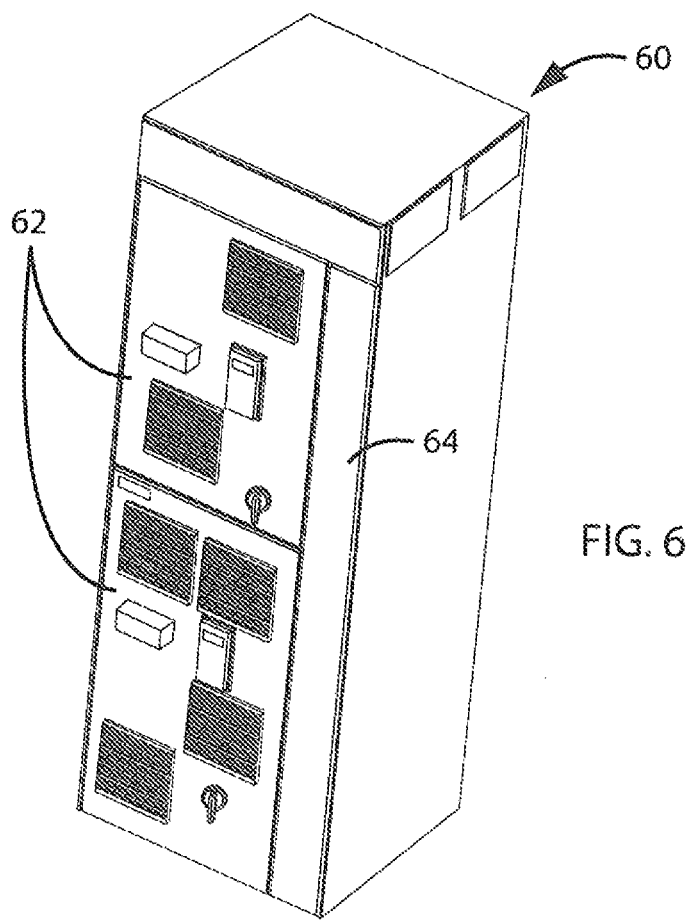
FIG. 6 is an isometric view of another exemplar electrical system which may be a section of an MCC in accordance with an embodiment of the invention.

Referring now to FIG. 6, an isometric view of another exemplar electrical system 60, which may be a section of a Motor Control Center (MCC), is provided in accordance with an embodiment of the invention. The electrical system 60 may include first doors 62 (or first panels) which may be opened to provide a compartment or volume of space for receiving a unit which may electrical components. The electrical system 60 may also include second doors 64 (or second panel) which may be opened to reveal a wire-way 65 disposed adjacent to the compartments covered by the first doors 62.

For use in a system environment, one of the first doors 62 may be opened, and a unit having sets of load stab conductors may be pushed into the compartment. A first set of load stab conductors of the unit may be pushed into the compartment, for example, to engage the vertical bus conductors 40 for receiving three-phase power. A second set of load stab conductors of the unit may be pushed into the compartment, for example, to engage electrical connectors 80 configured to receive the second set of load stab conductors (see FIG. 8). An electrical component of the unit may control electrical flow between the vertical bus conductors 40 (via the first set of load stab conductors) and the electrical connectors 80 (via the second set of load stab conductors). A lever 66, which may be provided on the first door 62, may actuate the electrical component to connect or disconnect the electrical flow, operating as a circuit breaker.

Figure 7:
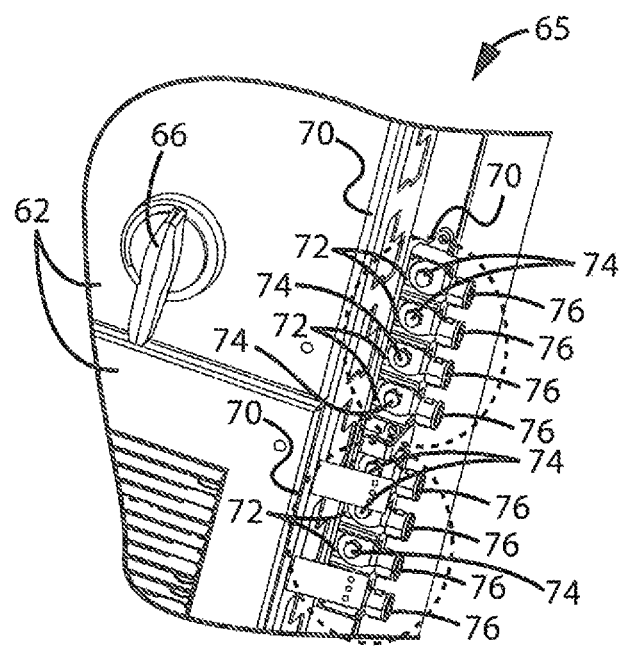
FIG. 7 is an isometric view of the electrical system of FIG. 6 in which a door or access panel for a wire-way has been removed, thereby exposing screw terminals.

Referring also to FIG. 7, an isometric view of the electrical system 60 in which second doors 64 has been removed, thereby exposing a wire-way 65 and screw terminals, is provided. The electrical connectors 80 (receiving the second set of load stab conductors from the unit) may, in turn, connect to lower portions of screw terminals 70, such as via conductor rails 72. Upper portions of the screw terminals 70, such as screws 74, may receive conductors, for example, in the form of crimped wire lugs 76 which may, in turn, be crimped to wires or cables leading to the system environment.

Figure 8:
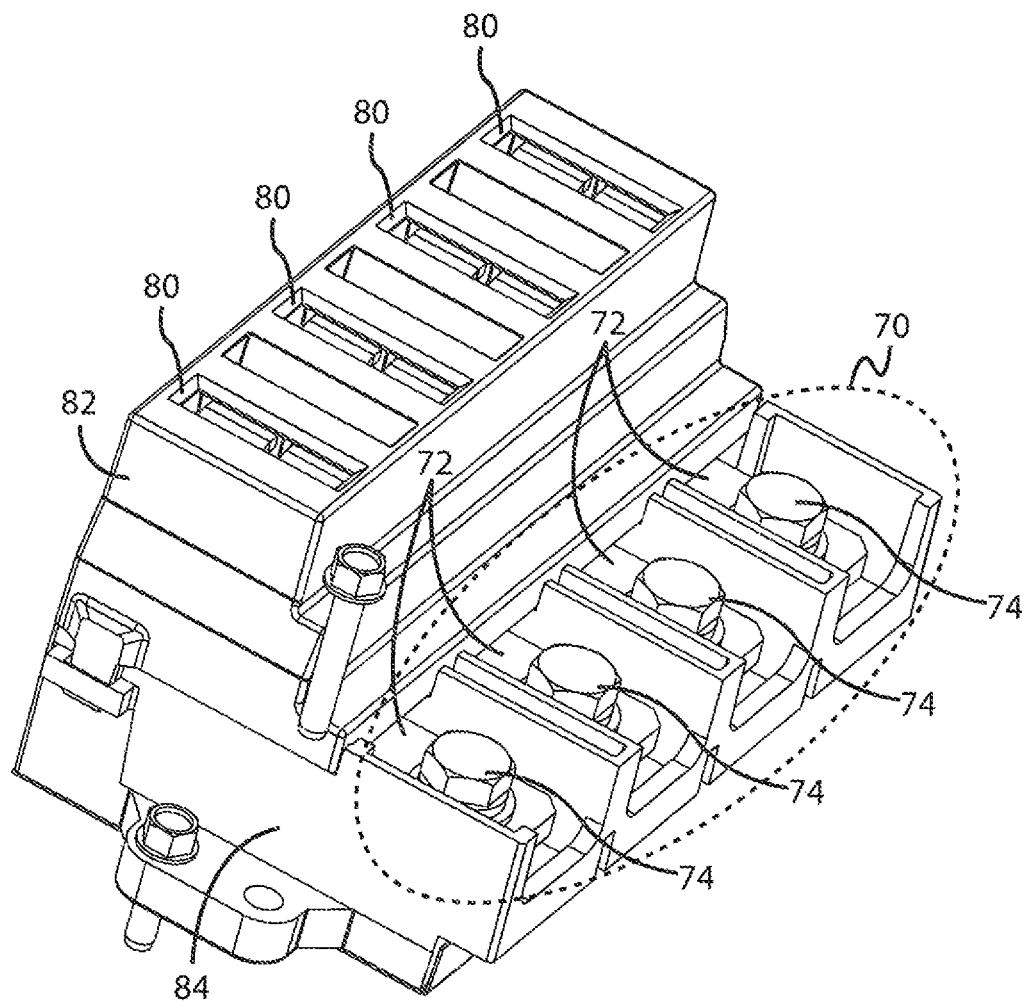
FIG. 8 is an isometric view of electrical connectors and screw terminals of FIG. 7.

Referring now to FIG. 8, an isometric view of electrical connectors 80 and screw terminals 70 of FIG. 7 is provided. The electrical connector 80 may be configured to receive conductors, such as a set of load stab conductors, upon the conductors being pushed into the electrical connectors 80.

The electrical connector 80 may be supported by an electrical connector frame 82, which could be a single molded part, and which may be positioned in the compartment of the electrical system 60 behind the first door 62.

The screw terminals 70 may have an upper portion, such as screws 74, configured to receive conductors, such as crimped wire lug conductors crimped to wires or cables. The screw terminals 70 may also have a lower portion, such as the conductor rails 72, for electrically communicating with a respective electrical connector 80. The screw terminals 70 may be positioned in the wire-way 65 of the electrical system 60 behind the second door 64. Crimped wire lugs conductors may be fastened, for example, by driving a screw 74 through the crimped wire lug to a conductor rail 72 and a screw terminal frame 84, which could be a single molded part, supporting the screw terminals 70. Wires or cables may also be crimped to the crimped wire lugs. Accordingly, a continuous electrical connection may be provided from the electrical connector 80 to the screw terminals 70, and in turn, to the crimped wire lugs and crimped wires.

The electrical connector frame 82 may be attached to the screw terminal frame 84 in various ways, such as via a snap fit retention mechanism, a fastener and so forth. The electrical connector frame 82 and the screw terminal frame 84 may be regarded as a continuous frame supporting the electrical connectors 80 and the screw terminals 70. In an alternative aspect, the electrical connector frame 82 and the screw terminal frame 84 could be molded as a single part.

Figure 9:
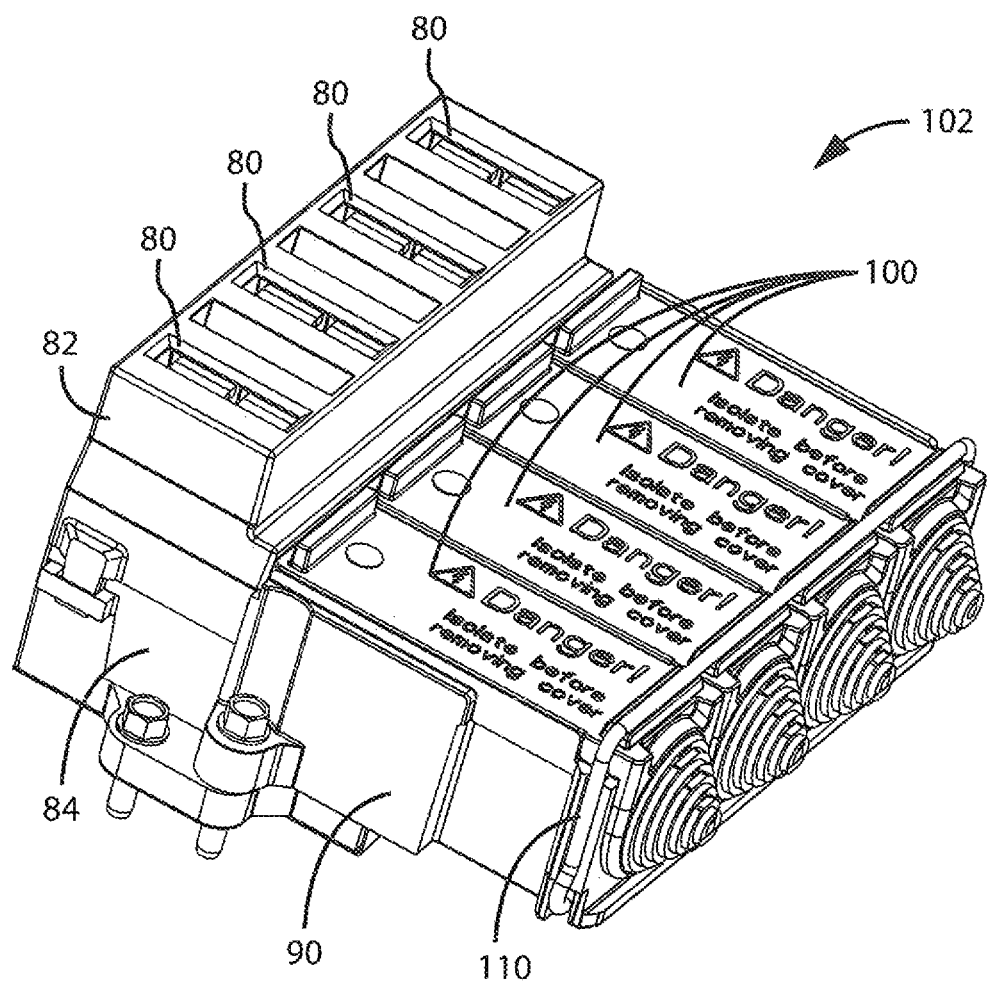
FIG. 9 is an isometric view of a frame element and electrically insulating covers disposed over the plurality of screw terminals of FIG. 8 in accordance with an embodiment of the invention.

Referring now to FIG. 9, an isometric view of a frame element 90, in communication with the electrical connector frame 82 and the screw terminal frame 84, and electrically insulating covers 100 disposed over the screw terminals 70 of FIG. 8, forming a terminal assembly 102, is provided in accordance with an embodiment of the invention. The electrical insulating covers 100 electrically insulate the upper portion of the screw terminals 70. The electrical insulating covers 100 could be made from plastic, rubber or some other electrical insulator, and could be mounted on the frame element 90 (see also FIGS. 14 and 15), which could be a single molded part, and which could be configured to engage with the electrical connector frame 82 and the screw terminal frame 84. In some aspects, frame element 90, the electrical connector frame 82 and the screw terminal frame 84 could be a continuous frame supporting the electrical connectors 80, the screw terminals 70 and the electrically insulating covers 100.

The terminal assembly 102 may include a single electrical connector 80 and screw terminals 70 configuration, or multiple electrical connectors 80 and screw terminals 70 (such as four electrical connectors 80 and four screw terminals 70 as illustrated). A single electrically insulating cover 100 could be provided to cover all of the screw terminals 70, or alternatively, discrete electrically insulating covers 100 could be provided to cover each of the screw terminals 70 as illustrated.

Figure 16:
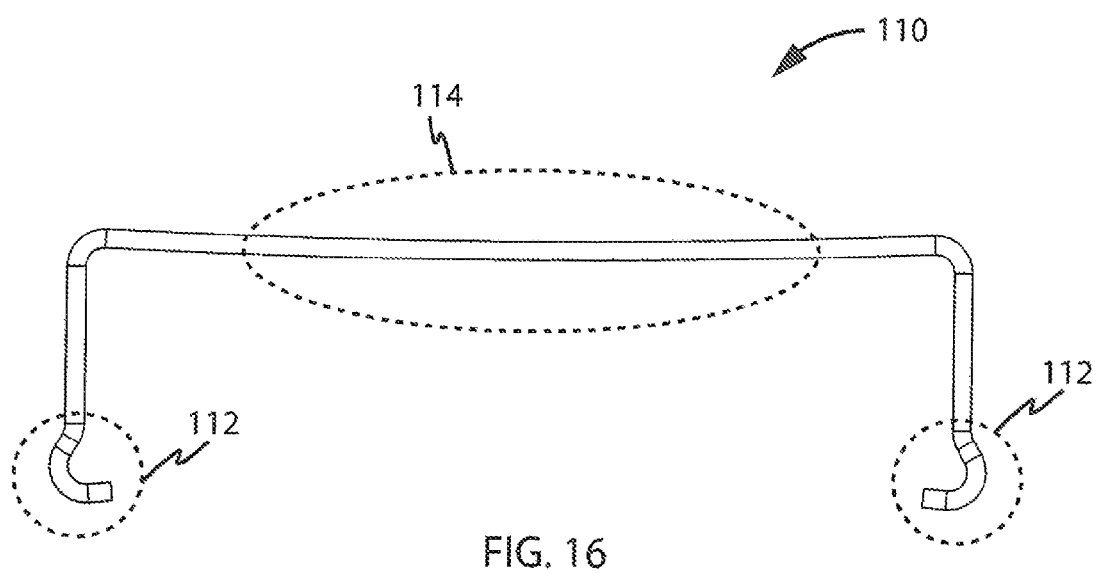
FIG. 16 is a front view of a retainer clip configured to retain electrically insulating covers to a frame element in a direction of screw terminals in accordance with an embodiment of the invention.

The terminal assembly 102 may further include one or more retainer clips 110, which could be metal spring clips, for example. Referring also to FIG. 16, the retainer clip 110 may be mounted to a frame, such as the frame element 90, via hooks 112, to retain the electrically insulating covers 100 in a direction of the screw terminals 70. The retainer clip 110 may also urge inwardly, toward the electrically insulating covers 100, in a center area 114 to ensure exertion of a retention force. Removal of the retainer clip 110 may require a tool, such as pliers. Accordingly, the retainer clip 110 may further improve safety by further ensuring presence of the electrically insulating covers 100.

Figure 10:
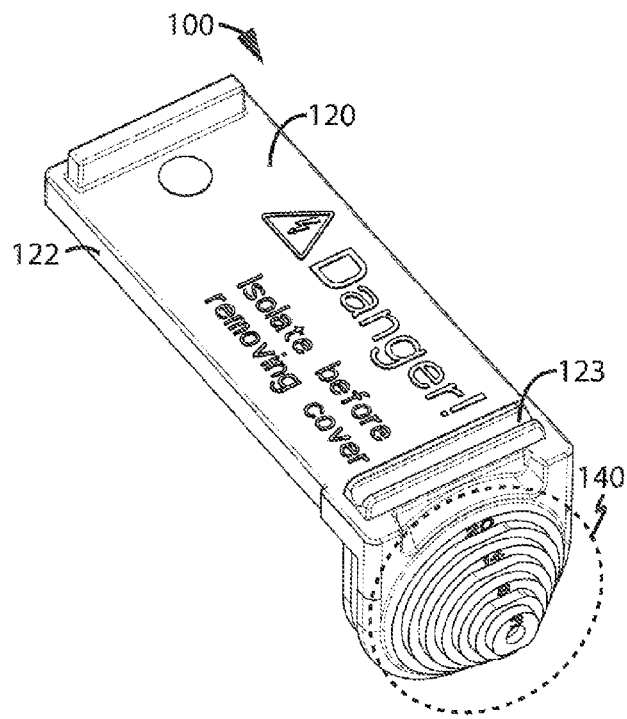
FIG. 10 is an isometric top view of an electrically insulating cover in accordance with an embodiment of the invention.
Figure 12:
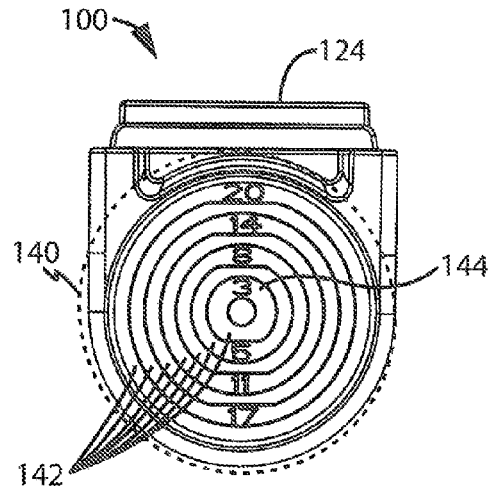
FIG. 12 is a front view of the electrically insulating cover of FIG. 10.
Figure 11:
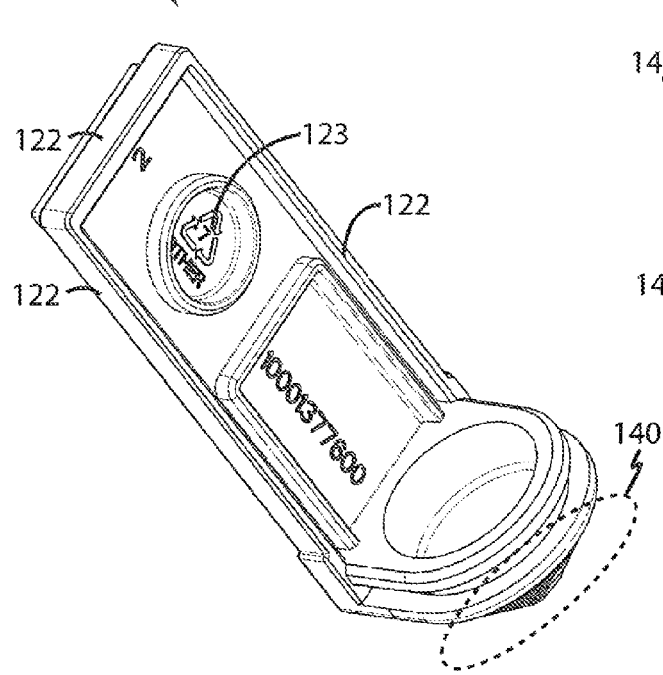
FIG. 11 is an isometric bottom view of the electrically insulating cover of FIG. 10.

Referring now to FIGS. 10-12, isometric top, bottom and front views, respectively, of the electrically insulating cover 100 are provided in accordance with an embodiment of the invention. The electrically insulating cover 100 may be configured to cover and electrically isolate an upper portion of a single screw terminal 70 as shown. In an alternative aspect, the electrically insulating cover may be configured to cover and electrically isolate upper portions of multiple screw terminals. The electrically insulating cover 100 may be manufactured as a single part molded from an electrically insulating material, such as rubber, plastic or the like.

The electrically insulating cover 100 may include a substantially flat, rectangular shaped upper surface 120 which may be disposed over the screw terminal 70. An electrically insulating cover edge 122 may be provided below the upper surface 120 for contacting a frame element edge 130 (see also FIG. 13) to ensure a continuous barrier providing electrical isolation between adjacent screw terminals. The upper surface 120 may include a channel 123 (or groove), preferably near an outer edge, formed by opposing ridges for accommodating the retainer clip 110. The upper surface 120 may also include text or other indicia conveying information to users, such as a warning of the presence of electrical voltage beneath the electrically insulating cover 100.

As may best be seen in FIG. 11, a positive retention feature 124 may be formed on an opposing, interior side of the upper surface 120. The positive retention feature 124 may engage an aperture 132 or hole of the frame element 90 (sec also FIGS. 13 and 14) for securing the electrically insulating cover 100 into position.

Figure 13:
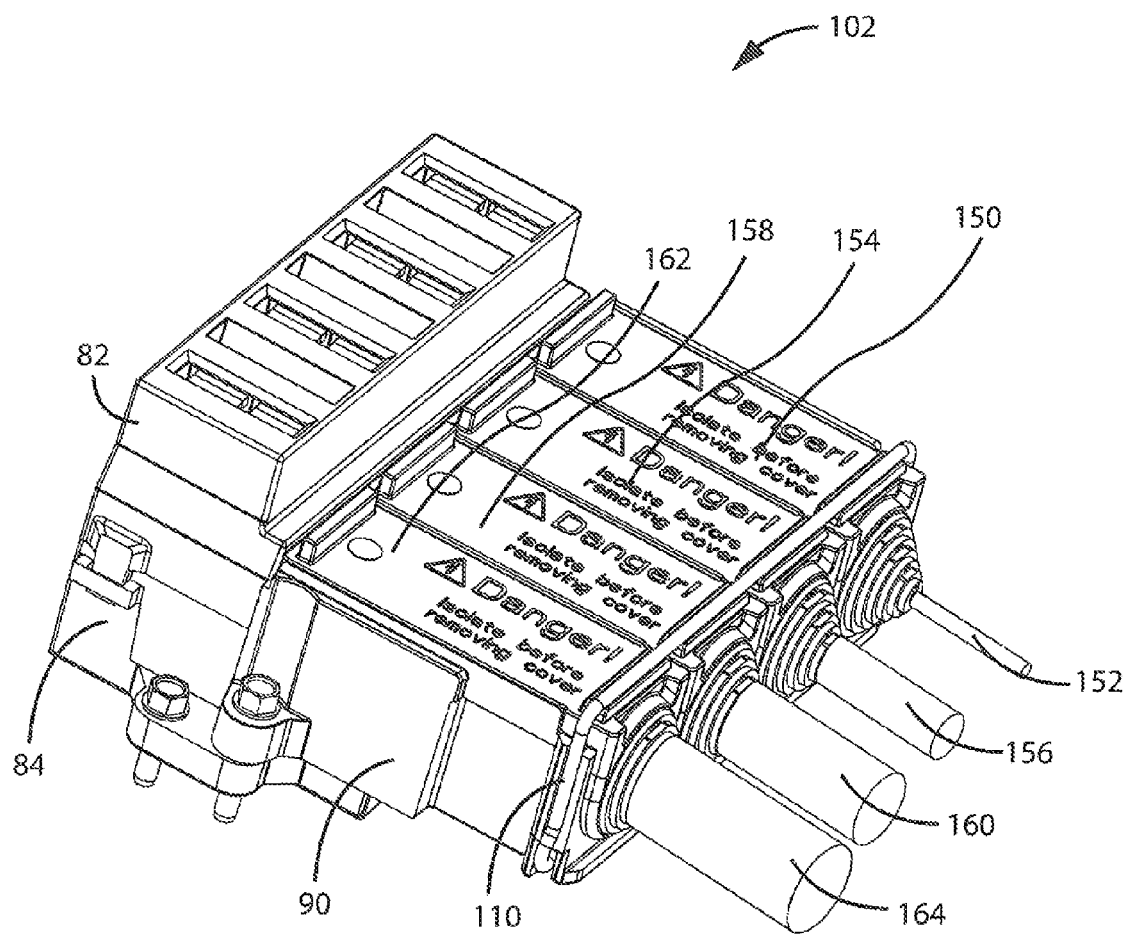
FIG. 13 is the isometric view of FIG. 9 with wire conductors of varying diameters circumferentially surrounded by cable glands of the electrically insulating covers in accordance with an embodiment of the invention.

Referring also to FIG. 13, the electrically insulating cover 100 may also include a cable gland 140 attached to an end of the upper surface 120, such as in a front area. The cable gland 140 may consist of multiple concentric rings 142 of varying diameters for supporting a wire or cable in communication with the screw terminal. Each ring 142 may be appropriately sized to circumferentially surround a conductor or cable of a particular diameter with substantial sealing contact, thereby providing continuous electrical isolation. The rings 142 may also be layered with differing distances from a screw terminal, such that a smaller ring 142 (which may be an inner ring) is further from the screw terminal, and a larger ring 142 (which may be outer ring) is closer to the screw terminal.

In operation, one or more excess rings 142 may be cut from the electrically insulating cover 100 in order to leave an appropriately sized ring 142 to circumferentially surround and substantially seal a wire or cable having a diameter corresponding to the appropriately sized ring 142. Each of the rings 142 may be marked with an indicium 144, such as a number, indicating corresponding ring diameters (or supported cable or wire sizes), or an American Wire Gauge (AWG) rating, or the like. The embodiment of FIGS. 10-12 include, by way of example, seven possible ring diameter/size configurations being supported, including diameter ratings "3," "5," "8," "11," "14," "17" and "20," which may be expressed in millimeters. The indicium 144 reflects a diameter or size of the cable or wire being used after cutting.

As illustrated, in FIG. 13, by way of example, a first electrically insulating cover 150 may have no rings 142 cut, leaving a ring size/diameter rating of 3, allowing an electrically insulating sealing contact with a correspondingly sized 3 millimeter diameter wire 152. A second electrically insulating cover 154 may have one ring 142 cut, leaving a ring size/diameter rating of 5, allowing an electrically insulating sealing contact with a correspondingly sized 5 millimeter diameter wire 156. A third electrically insulating cover 158 may have two rings 142 cut, leaving a ring size/diameter rating of 8, allowing an electrically insulating sealing contact with a correspondingly sized 8 millimeter diameter wire 160. Finally, a fourth electrically insulating cover 162 may have four rings 142 cut, leaving a ring size/diameter rating of 14, allowing an electrically insulating sealing contact with a correspondingly sized 14 millimeter diameter wire 164.

Figure 14:
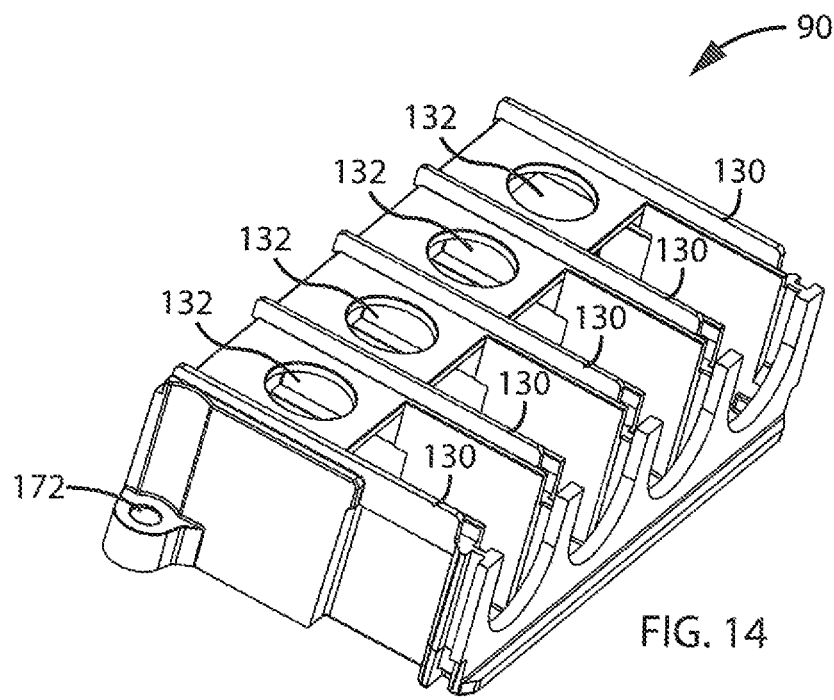
FIG. 14 is an isometric top view of a frame element in accordance with an embodiment of the invention.
Figure 15:
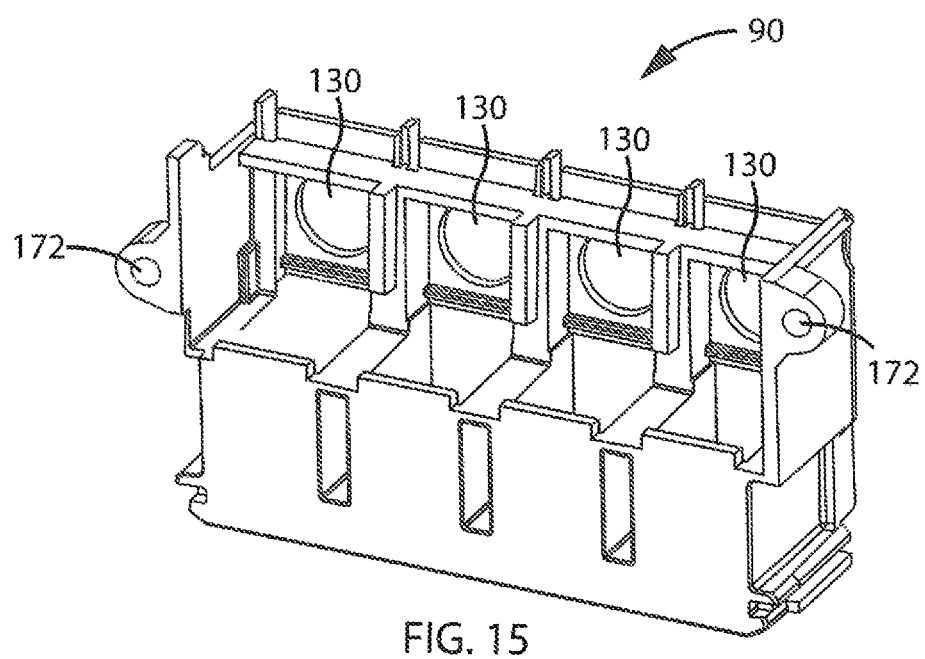
FIG. 15 is an isometric bottom view of the frame element of FIG. 13.

Referring now to FIGS. 14 and 15, isometric top and bottom views, respectively, of the frame element 90 are provided in accordance with an embodiment of the invention. The frame element 90 may be manufactured as a single part molded from an electrically insulating material, such as plastic or the like. The frame element 90 may include frame element edges 130 for contacting electrically insulating cover edges 122 to provide continuous electrical isolation between adjacent screw terminals. The frame element 90 may also include apertures 132 or holes for engaging positive retention features 124 of electrically insulating covers 100 for ensuring proper assembly. The frame element 90 may also include apertures 170 for receiving fasteners such as screws or bolts, for mounting to the screw terminal frame 84 and, in turn, the electrical system 60.

Figure 17:
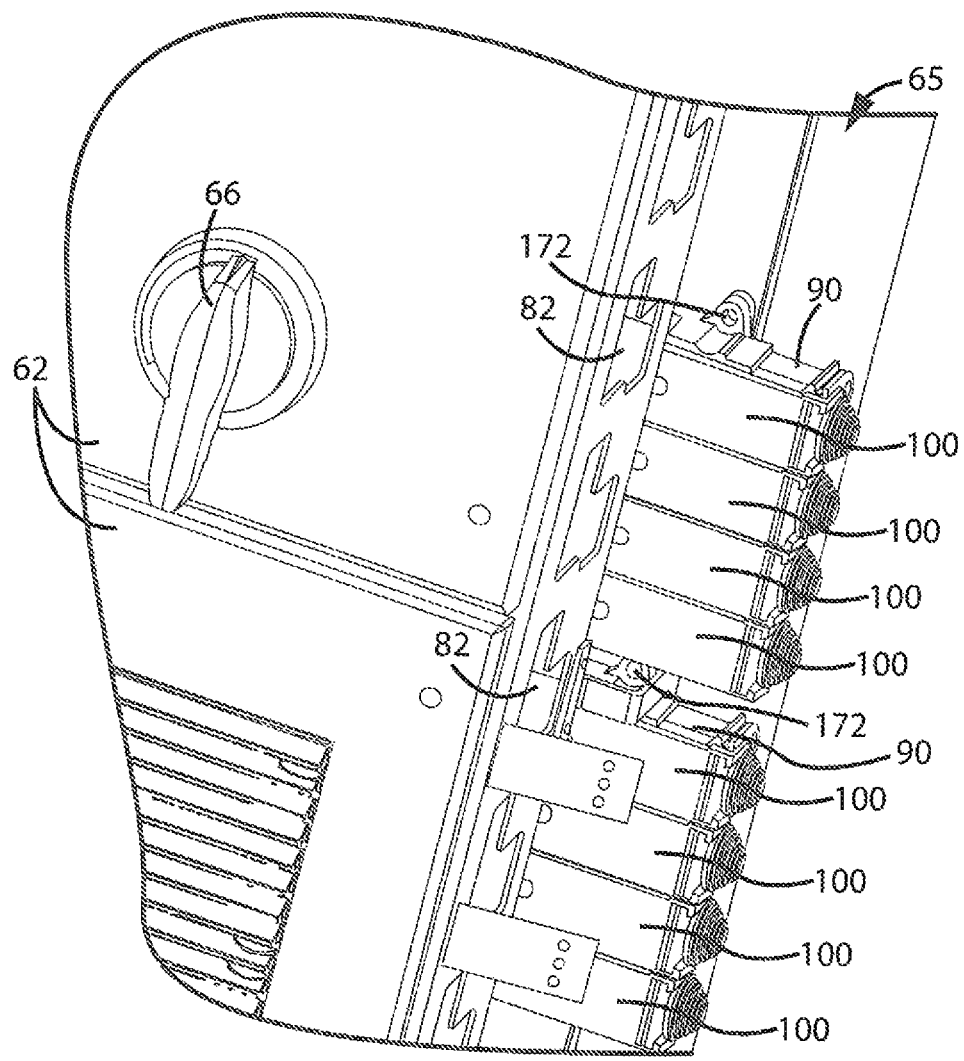
FIG. 17 is an isometric view of the electrical system of FIG. 7 in which electrically insulating covers are provided, in accordance with an embodiment of the invention.

Referring now to FIG. 17, an isometric view of the electrical system 60 of FIG. 7 is provided in which electrically insulating covers 100 are provided. The electrically insulating covers 100 electrically isolate the screw terminals 70 while the second door 64 is opened to reveal the wire-way 65. Accordingly, short-circuit and/or shock protection may be provided, including with respect to IEC 60529 IP20 and similar standards.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the tennis "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Various features of the invention are set forth in the following claims. It should be understood that the invention is not limited in its application to the details of construction and arrangements of the components set forth herein. The invention is capable of other embodiments and of being practiced OF carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention: The embodiments described herein explain the best modes known for practicing the invention and will enable others skilled in the art to utilize the invention. All of the publications described herein including patents and non-patent publications are hereby incorporated herein by reference in their entireties.

The present invention may be part of a "safety system" used to protect human life and limb in a field, construction or other environment. Nevertheless, the term "safety," "safely" or "safe" as used herein is not a representation that the present invention will make the environment safe or that other systems will produce unsafe operation. Safety in such systems depends on a wide variety of factors outside of the scope of the present invention including: design of the safety system, installation and maintenance of the components of the safety system, and the cooperation and training of individuals using the safety system. Although the present invention is intended to be highly reliable, all physical systems are susceptible to failure and provision must be made for such failure.

What is claimed is:

1. An electrically insulating cover for a terminal assembly comprising:
    an upper surface configured to cover an upper portion of a screw terminal; and
    a cable gland attached to an end of the upper surface, the cable gland including a plurality of concentric rings of varying diameters, each ring being configured to circumferentially surround and substantially seal a cable or wire of a particular size,
    wherein the electrically insulating cover is operable to electrically insulate an upper portion of a screw terminal,
    wherein the electrically insulating cover provides an opening for supporting a conductor received by the screw terminal,
    wherein the opening is configured to circumferentially surround a conductor upon the screw terminal receiving the conductor at the upper portion, and
    wherein the gland is further comprising an indicium on each of the concentric rings indicating a supported cable or wire size.

2. The electrically insulating cover of claim 1, further comprising a channel formed on the upper surface for accommodating a retainer clip.

3. The electrically insulating cover of claim 1, further comprising a retention feature formed on an opposing side of the upper surface for engaging a frame.

4. A terminal assembly comprising:
    an electrical connector configured to receive a conductor upon the conductor being pushed into the electrical connector;
    a screw terminal having an upper portion configured to receive a conductor and a lower portion configured to electrically communicate with the electrical connector; and
    an electrically insulating cover disposed over the screw terminal, wherein the electrically insulating cover is operable to electrically insulate the upper portion of the screw terminal, wherein the electrically insulating cover provides an opening for supporting a conductor received by the screw terminal, wherein the opening is configured to circumferentially surround a conductor upon the screw terminal receiving the conductor at the upper portion, and further comprising a frame supporting the electrical connector and the screw terminal, a retainer clip mounted to the frame, the retainer clip being configured to retain the electrically insulating cover in a direction of the screw terminal, and a channel formed on an upper surface of the electrically insulating cover, wherein the channel accommodates the retainer clip.

5. The terminal assembly of claim 4, wherein the electrically insulating cover includes a cable gland.

6. The terminal assembly of claim 5, wherein the cable gland supports a plurality of conductor diameters via concentric rings.

7. The terminal assembly of claim 6, further comprising an indicium on each of the concentric rings indicating a supported cable or wire size.

8. The terminal assembly of claim 4, wherein the electrical connector is configured to receive a load stab conductor.

9. The terminal assembly of claim 4, wherein the upper portion of the screw terminal is configured to receive a crimped wire lug conductor.

10. The terminal assembly of claim 4, further comprising a frame, and wherein the electrical connector, the screw terminal, and the electrically insulating cover are each ones of a plurality of electrical connectors, screw terminals and electrically insulating covers, respectively, supported by the frame.

11. An electrical system comprising:
a compartment configured to receive a unit having an electrical component;
a wire-way disposed adjacent to the compartment;
a plurality of electrical connectors provided, in the compartment, the electrical connectors configured to receive a set of load stab conductors upon a unit having a set of load stab conductors being pushed into the compartment causing the set of load stab conductors to be pushed into the electrical connectors;
a plurality of screw terminals provided in the wire-way, each screw terminal having an upper portion configured to receive a crimped wire lug conductor and a lower portion configured to electrically communicate with an electrical connector;
a frame supporting the plurality of electrical connectors and the plurality of screw terminals; and
a plurality of electrically insulating covers disposed over the plurality of screw terminals, wherein the electrically insulating covers are operable to electrically insulate the upper portions of the screw terminals,
wherein the electrically insulating covers provide openings for supporting conductor received by the screw terminals,
wherein the opening is configured to circumferentially surround a conductor upon the screw terminal receiving the crimped wire lug conductor at the upper portion, and
is further comprising a retainer clip mounted to the frame, the retainer clip being configured to retain the plurality of electrically insulating covers in a direction of the plurality of screw terminals,
wherein the electrically insulating covers each include a channel formed on an upper surface of the electrically insulating cover, wherein the channel accommodates the retainer clip.

12. The electrical system of claim 11, wherein the electrically insulating covers each include a cable gland.

13. The electrical system of claim 12, wherein the cable gland supports a plurality of conductor diameters via concentric rings.

14. The electrical system of claim 13, further comprising an indicium on each of the concentric rings indicating a supported cable or wire size.

* * * * *